(12) United States Patent
Wang (10) Patent No.: US 12,517,699 B1
(45) Date of Patent: Jan. 6, 2026

(54) SORTING AND CONTROL TECHNIQUES FOR REDUCING DIVERGENCE

(71) Applicant: Advanced Micro Devices, Inc., Santa Clara, CA (US)

(72) Inventor: Xin Wang, Shanghai (CN)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/899,406

(22) Filed: Sep. 27, 2024

(51) Int. Cl.
*G06F 16/245* (2019.01)
*G06F 7/08* (2006.01)
*G06F 9/38* (2018.01)

(52) U.S. Cl.
CPC ............ *G06F 7/08* (2013.01); *G06F 9/38885* (2023.08); *G06F 16/245* (2019.01); *G06F 9/3887* (2013.01)

(58) Field of Classification Search
CPC .... G06F 16/245; G06F 9/3887; G06F 9/3888; G06F 9/38885; G06F 7/08
See application file for complete search history.

(56) References Cited

U.S. PATENT DOCUMENTS

| | | | |
|---|---|---|---|
| 2012/0204014 A1* | 8/2012 | Leather ................. | G06F 9/3888 712/223 |
| 2014/0149710 A1* | 5/2014 | Rogers .................. | G06F 9/3851 711/170 |
| 2017/0178398 A1* | 6/2017 | Afra ........................ | G06T 15/80 |
| 2020/0409695 A1* | 12/2020 | Oldcorn ................... | G06F 8/45 |
| 2023/0409337 A1* | 12/2023 | Chajdas .............. | G06F 9/30072 |
| 2025/0068429 A1* | 2/2025 | Junkins ................. | G06F 9/3887 |

* cited by examiner

*Primary Examiner* — James E Richardson
(74) *Attorney, Agent, or Firm* — Volpe Koenig (57) ABSTRACT

A technique is disclosed for reducing divergence among a plurality of executing wavefronts. A first wavefront requests that work-items of the first wavefront be sorted based on a sort parameter together with work-items of one or more other wavefronts, and the first wavefront is requested to pause execution. A query is issued for a status of the request, and a query result is provided to the first wavefront. Based on the query result, the first wavefront determines a subsequent action.

20 Claims, 9 Drawing Sheets

| Wavefront #1 → | B | A | D | A |
| Wavefront #2 → | A | D | D | B |
| Wavefront #3 → | C | B | C | A |
| Wavefront #4 → | A | A | C | D |

BIN A     BIN B     BIN C     BIN D

FIG. 6C

BIN A     BIN B     BIN C     BIN D

SORTING AND CONTROL TECHNIQUES FOR REDUCING DIVERGENCE

BACKGROUND

On parallel processors such as single-instruction-multiple-data ("SIMD") or single-instruction-multiple-thread ("SIMT") processor, individual items of execution ("work-items") are grouped and executed together as wavefronts to take advantage of the parallel nature of these processors. For example, multiple work-items execute the same instruction in a respective lane of the wavefront with different data in the same clock cycle. Under some situations, it is possible for different work-items to have divergent control flow paths. For instance, if a conditional branch occurs that is conditional on data that differs between work-items, then some work-items may take the branch while others do not. Under such situations, the SIMD or SIMT machine can no longer be efficiently utilized, since it must execute different instructions for different work items in the wavefront. Since, divergent flow control is common in practice, improvements are constantly being made in the area of executing programs with divergent control flow on parallel SIMD and SIMT processors.

BRIEF DESCRIPTION OF THE DRAWINGS

A more detailed understanding may be had from the following description, given by way of example in conjunction with the accompanying drawings wherein.

DETAILED DESCRIPTION

Reducing divergence among a plurality of wavefronts is critical for maximizing the efficiency of parallel processors such as SIMD and SIMT processors. When work-items within a wavefront follow different control flow paths, the processor must execute instructions sequentially rather than in parallel, leading to underutilization of hardware resources and increased execution time.

Minimizing divergence simplifies control logic, reduces complexity, and enhances predictability, enabling more effective scheduling and optimization. This reduction in divergence also leads to lower power consumption, which is particularly important for large-scale data centers and portable devices. In applications such as graphics processing, scientific computing, and machine learning, minimizing divergence improves computational throughput and overall performance, making it a factor in optimizing parallel processing architectures.

A technique is disclosed for reducing divergence among a plurality of executing wavefronts, each of the wavefronts having a plurality of work-items. A first wavefront requests that work-items of the first wavefront be sorted based on a sort parameter together with work-items of one or more other wavefronts, and the first wavefront is requested to pause execution. A query is issued for a status of the request, and a query result is provided to the first wavefront. Based on the query result, the first wavefront determines a subsequent action.

In some examples, a sorting operation is performed that sorts work-items into a plurality of bins, wherein work-items in each one of the plurality of bins have a common parameter. In some such examples, each one of the plurality of bins includes work-items selected to minimize divergence when executed on parallel processors (e.g., SIMD units) of a compute unit. In some such examples, the query result is based on a level of work-items in at least one of the bins.

In some examples, the query result indicates whether the sorting operation is ready or near ready to return work-items to the first wavefront. If the query result indicates that the sorting operation is ready or near ready to return work-items to the first wavefront, the first wavefront waits for the sorting operation to return work-items that have been sorted into a single bin to the first wavefront. Alternatively, if the query result indicates that the sorting operation is neither ready nor near ready to return work-items to the first wavefront, the first wavefront issues a request to the sorting operation requesting that available work-items be provided to the first wavefront.

In some examples, if the query result indicates that the sorting operation is neither ready nor near ready to return work-items to the first wavefront, the first wavefront issues a request to perform a flush that results in return of divergent work items.

In some examples, the query result indicates that the sorting operation is neither ready nor near ready to return work items to the first wavefront if a rate of change in a level of a bin fails to exceed a threshold over a period of a plurality of queries.

In some examples, a countdown timer is started when requesting the first wavefront to pause execution and the sorting operation is queried upon expiration of the countdown timer. In some such examples, each of the plurality of wavefronts has an individually configurable countdown timer duration.

Figure 1:
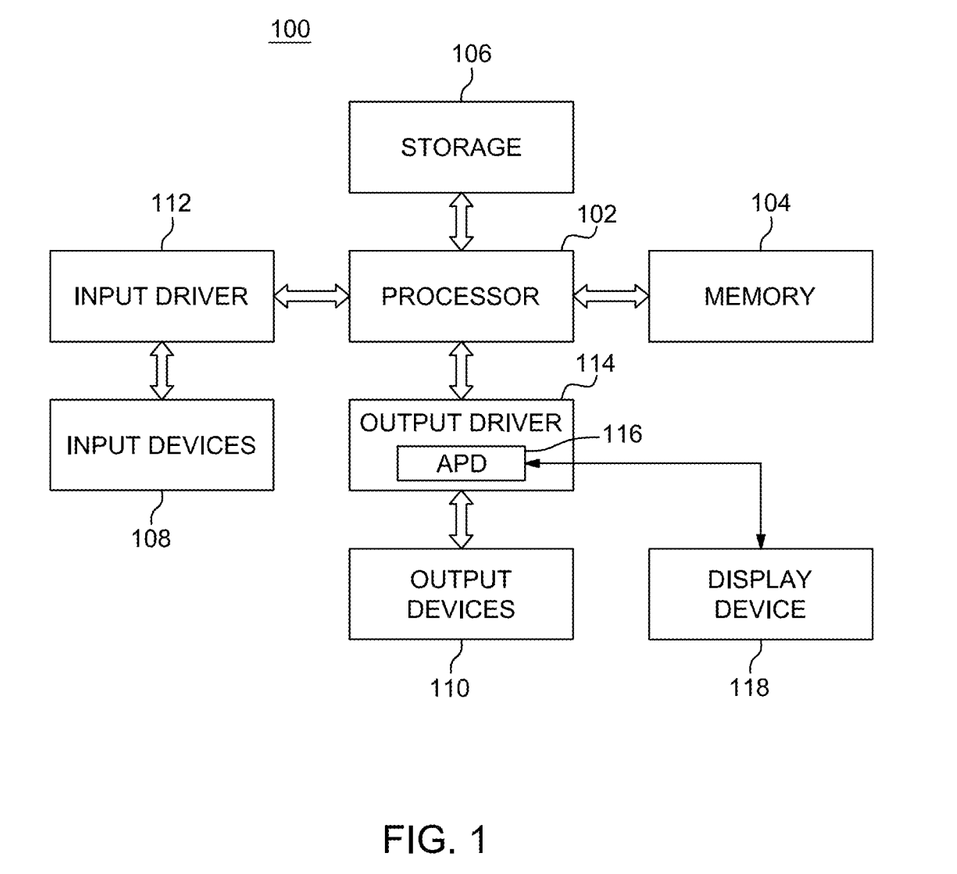
FIG. 1 is a block diagram of an example device in which one or more disclosed embodiments may be implemented.

FIG. 1 is a block diagram of an example device 100 in which one or more features of the disclosure can be implemented. The device 100 can include, for example, a computer, a gaming device, a handheld device, a set-top box, a television, a mobile phone, server, a tablet computer or other types of computing devices. The device 100 includes a processor 102, a memory 104, a storage 106, one or more input devices 108, and one or more output devices 110. The device 100 can also optionally include an input driver 112 and an output driver 114. It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, a hard disk drive, a solid-state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display device 118, a display connector/interface (e.g., an HDMI or DisplayPort connector or interface for connecting to an HDMI or Display Port compliant device), a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present. The output driver 116 includes an accelerated processing device ("APD") 116 which is coupled to a display device 118. The APD accepts compute commands and graphics rendering commands from processor 102, processes those compute and graphics rendering commands, and provides pixel output to display device 118 for display. As described in further detail below, the APD 116 includes one or more parallel processing units to perform computations in accordance with a parallel processing paradigm, such as a single-instruction-multiple-data ("SIMD") paradigm or a single-instruction-multiple-threads ("SIMT"). Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and provides graphical output to a display device 118. For example, it is contemplated that any processing system that performs processing tasks in accordance with a parallel processing paradigm may perform the functionality described herein. Alternatively, it is contemplated that computing systems that do not perform processing tasks in accordance with a parallel processing paradigm can also perform the functionality described herein.

Figure 2:
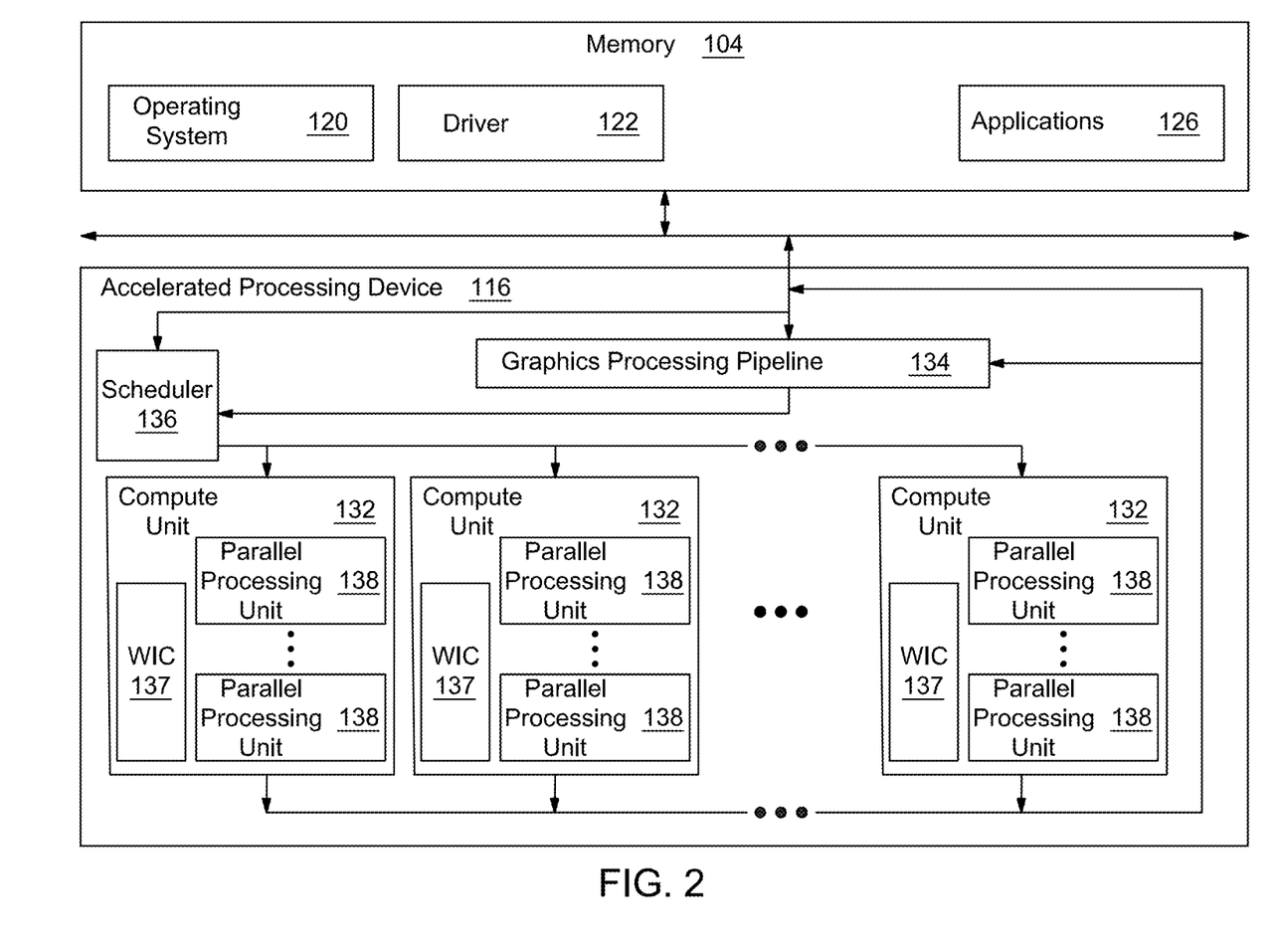
FIG. 2 is a block diagram of the device of FIG. 1, illustrating additional detail, according to an example.
Figure 3:
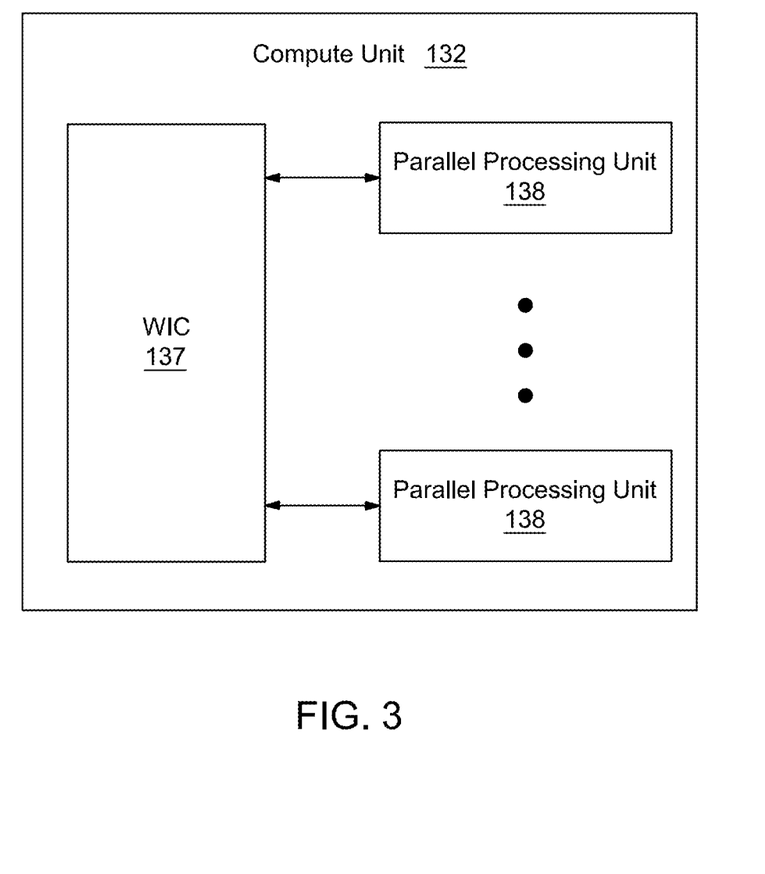
FIG. 3 is a block diagram illustrating a graphics processing pipeline, according to an example.

FIG. 2 is a block diagram of aspects of device 100, illustrating additional details related to execution of processing tasks on the APD 116. The processor 102 maintains, in system memory 104, one or more control logic modules for execution by the processor 102. The control logic modules include an operating system 120, a kernel mode driver 122, and applications 126. These control logic modules control various features of the operation of the processor 102 and the APD 116. For example, the operating system 120 directly communicates with hardware and provides an interface to the hardware for other software executing on the processor 102. The kernel mode driver 122 controls operation of the APD 116 by, for example, providing an application programming interface ("API") to software (e.g., applications 126) executing on the processor 102 to access various functionality of the APD 116. The kernel mode driver 122 also includes a just-in-time compiler that compiles programs for execution by processing components (such as the parallel processing units 138 discussed in further detail below) of the APD 116.

The APD 116 executes commands and programs for selected functions, such as graphics operations and non-graphics operations that are or can be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more parallel processing unit 138 that perform operations at the request of the processor 102 in a parallel manner according to a parallel processing paradigm, such as SIMD or SIMT. In such paradigms, multiple processing elements execute the same instruction across multiple data elements or threads. The multiple processing elements share a single program control flow unit and program counter and thus execute the same program but are able to execute that program with or using different data. In one example, each parallel processing unit 138 includes sixteen lanes, where each lane executes the same instruction at the same time as the other lanes in the parallel processing unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program or kernel that is to be executed in parallel according to the parallel processing paradigm employed. For example, in a SIMD architecture, multiple work-items execute the same instruction simultaneously on different data elements. Work-items can be executed simultaneously as a "wavefront" on a parallel processing unit 138, where each work-item executes the same instruction with different data and where different work-items can execute a different control flow path through the use of predication. In a SIMT architecture, work-items correspond to threads that can be executed simultaneously on the parallel processing unit 138, where different threads can execute different control flow paths. Threads are grouped into "warps" or "wavefronts", which are scheduled or executed together.

For the purposes of this description, the term "wavefront" will be used, but it should be understood that this term broadly describes work-items that can be executed simultaneously and is inclusive of both "wavefronts" and "warps." One or more wavefronts are included in a "work group," which includes a collection of work-items designated to execute the same program. A work group can be executed by executing each of the wavefronts that make up the work group. In alternatives, the wavefronts are executed sequentially on a single parallel processing unit 138 or partially or fully in parallel on different parallel processing unit 138. Wavefronts can be thought of as the largest collection of work-items that can be executed simultaneously on a single parallel processing unit 138. Thus, if commands received from the processor 102 indicate that a particular program is to be parallelized to such a degree that the program cannot execute on a single parallel processing unit 138 simultaneously, then that program is broken up into wavefronts which are parallelized on two or more parallel processing units 138 or serialized on the same parallel processing unit 138 (or both parallelized and serialized as needed). A work-item coalescer ("WIC") 137 is present in the compute units 132 and discussed more fully below. A scheduler 136 performs operations related to scheduling various wavefronts on different compute units 132 and parallel processing units 138.

The parallelism afforded by the compute units 132 is suitable for graphics related operations such as pixel value calculations, vertex transformations, and other graphics operations and non-graphics operations (sometimes known as "compute" operations). Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Execution of a shader program may lead to control flow that is divergent. More specifically, the parallel processing units 138 of the APD 116 execute a shader program in, for example, a SIMD manner, in which instructions of the shader program are executed for multiple work-items simultaneously. A single control flow unit fetches and executes instructions, and the instructions are executed for multiple different items of data associated with the different work-items. Divergent control flow occurs when an instruction that modifies control flow is executed for multiple work-items simultaneously, but the target for the instruction is different for at least two of those work-items. The two work-items would then be redirected to two different locations in the shader, which would mean that the work-items could not be executed simultaneously in a SIMD manner. In one example, a conditional branch is executed that branches if a particular variable is less than 0. Multiple work-items execute this branch simultaneously, according to the SIMD paradigm, but because the conditional branch is based on the value of the variable, which can be different for the different work-items, some of the work-items take the branch and other work-items do not take the branch. As explained below, WIC 137 operates to mitigate divergence by sorting work-items of wavefronts into bins based on a sorting parameter, where each bin includes work items selected to minimize divergence when executed on parallel processing units 138 of a compute unit 132. In some examples, WIC 137 responds to queries from wavefronts in accordance with the status of sorting operation(s). In some examples, the sorting parameter is any data by which the WIC 137 can sort the work-items. In some examples, the sorting parameter is a parameter by which the wavefronts determine which code to execute. In an example, the sorting parameter is a parameter upon which the result of a conditional branch, indirect jump (e.g., jump based on code address), or function pointer call (e.g., a function call to a function at an address determined by the sorting parameter) depends. In other words, the point of subsequent execution is determined by the sorting parameter.

Figure 4:
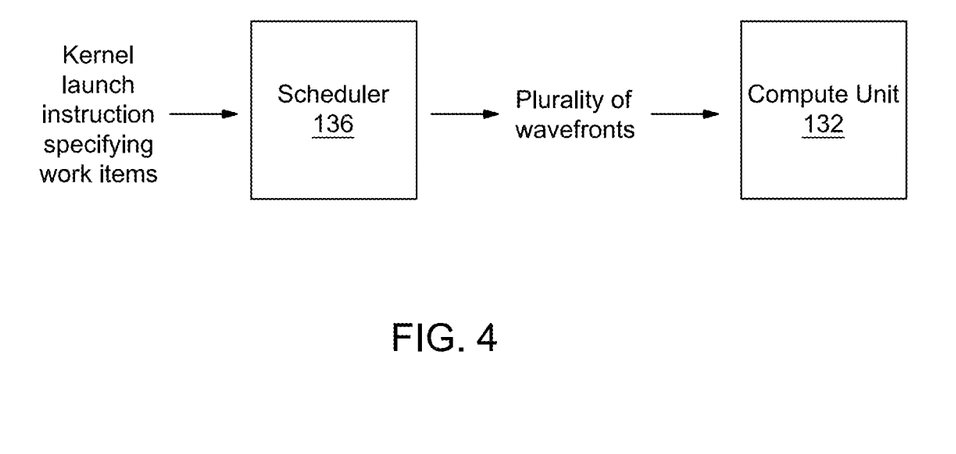
FIG. 4 illustrates the operation of a kernel launch resulting in execution of a plurality of wavefronts, according to an example.

FIG. 4 illustrates the operation of a kernel launch resulting in execution of a plurality of wavefronts on parallel processing units 138 of a compute unit 132, according to an example. As noted above, a wavefront is a group of work-items that execute in parallel, e.g., they execute the same instruction at the same time but on different data elements. A kernel launch of wavefronts refers to the process of initiating execution of such parallel computation tasks. Before launching, a processor (e.g., processor 102) identifies a number of work-items that are to be executed and requests the APD 116 to launch a kernel for this number of work-items. The APD 116 launches this number of work-items, grouping the work-items into wavefronts as appropriate.

After the kernel is launched, it is possible for different work-items in a wavefront to have divergent paths. For instance, as explained above, if a conditional branch occurs that is conditional on data that differs between work-items, then some work-items in a wavefront may take the branch while others do not. In accordance with the techniques disclosed herein, at some point in execution, for example, by determined by normal execution flow, the wavefront sends its work-items to work-item coalescer ("WIC") 137 for sorting and the wavefront is requested to pause execution. In other words, in some examples, the "request and pause" is an instruction or set of instructions programmed into the code executed by the work-items, and when the wavefront arrives at this instruction or set of instructions, the wavefront requests the WIC 137 to perform the sorting. WIC 137 sorts the work-items from the paused wavefront together with work-items of one or more other paused wavefronts. In some examples, WIC 137 sorts the work-items from multiple paused wavefronts into bins based on a sorting parameter, e.g., a sort-key, where each bin includes work-items selected to minimize divergence when executed in parallel on parallel processing units 138 of a compute unit 132. In some examples, when a bin includes a sufficient number of work-items, the work-items in the bin are returned to a paused wavefront for execution.

In some examples, the sort-key is also used by the wavefront at run-time to determine whether the work-items in the wavefront have encountered sufficient divergence to trigger the wavefront to send its work-items to WIC 137. For example, based on the sort-key, the wavefront is able to determine at run-time whether its work-items have a high enough level of homogeneity to skip the sorting operation. In some examples, the level of homogeneity required to skip sorting is set based on a state of the wavefront and/or based on a length of a subsequent kernel. For example, in some cases the level of homogeneity required to skip sorting is set lower (i.e., the work-items in the wavefront are required to be less homogeneous) when the length of the subsequent kernel is short.

Figure 5:
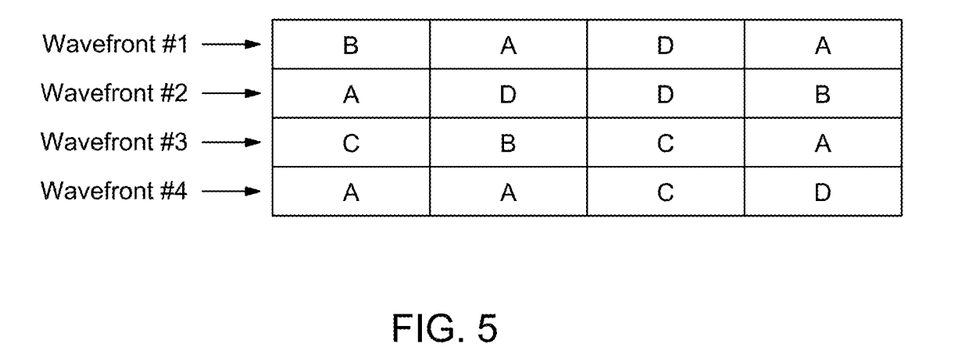
FIG. 5 presents a chart illustrating wavefronts provided to a work item coalescer ("WIC"), according to an example.

FIG. 5 presents a chart illustrating work-items from four wavefronts (numbered Wavefront #1 to Wavefront #4) provided to a work-item coalescer ("WIC"), according to an example. For simplicity, each wavefront is shown as having 4 work-items; however, it will be understood that a wavefront will typically have a higher number of work-items. Each row in FIG. 5 corresponds to the work-items provided to WIC 137 from a particular wavefront just prior to being paused. A sorting parameter for each work-item in the wavefront is also shown. For example, prior to being paused, Wavefront #1 included one work-item associated with sorting parameter B, two work-items associated with sorting parameter A and one work-item associated with sorting parameter D.

Figure 6A:
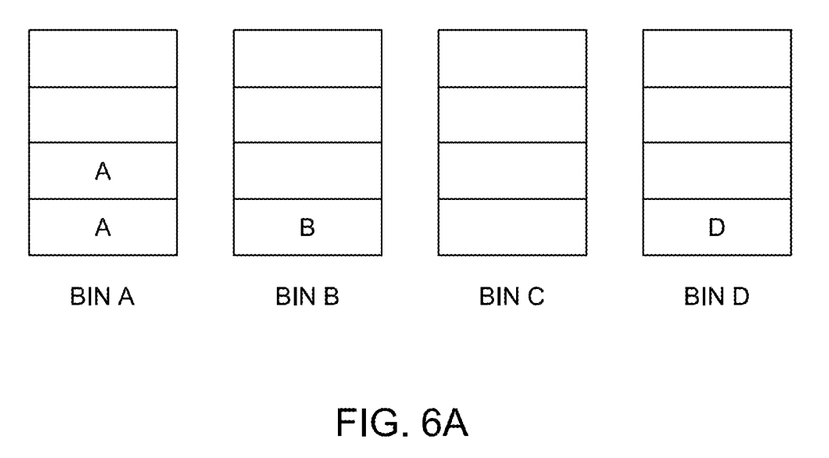
FIGS. 6A-6D illustrate a technique for sorting work-items within the WIC, according to an example.
Figure 6B:
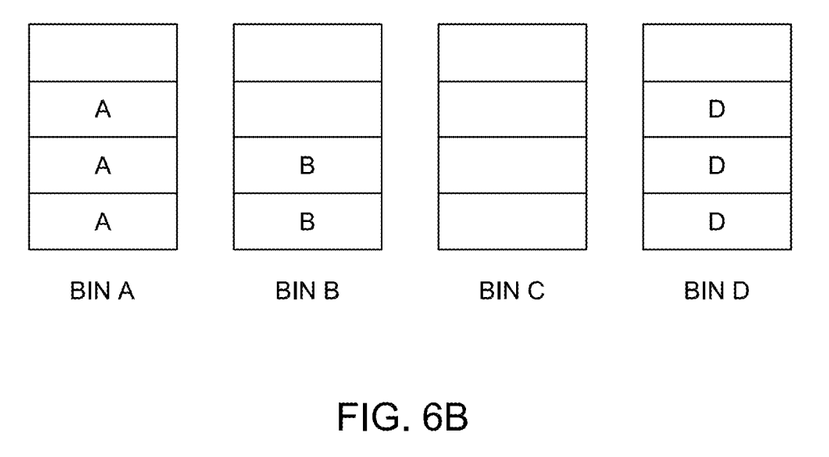
Figure 6C:
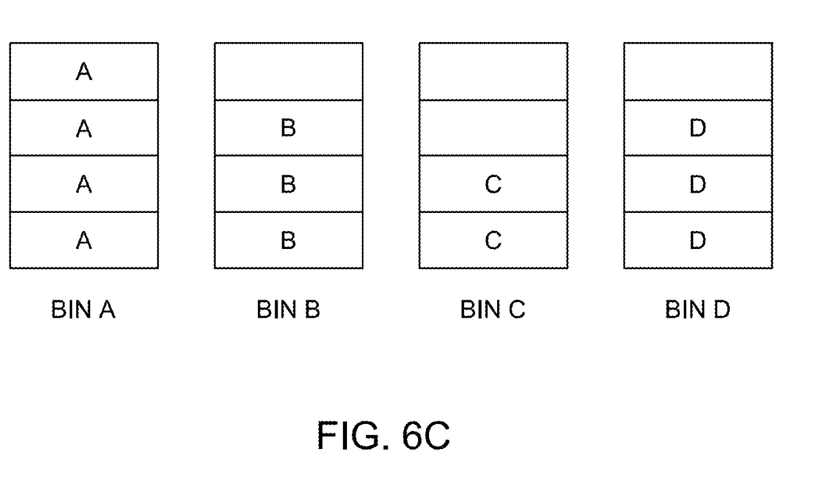
Figure 6D:
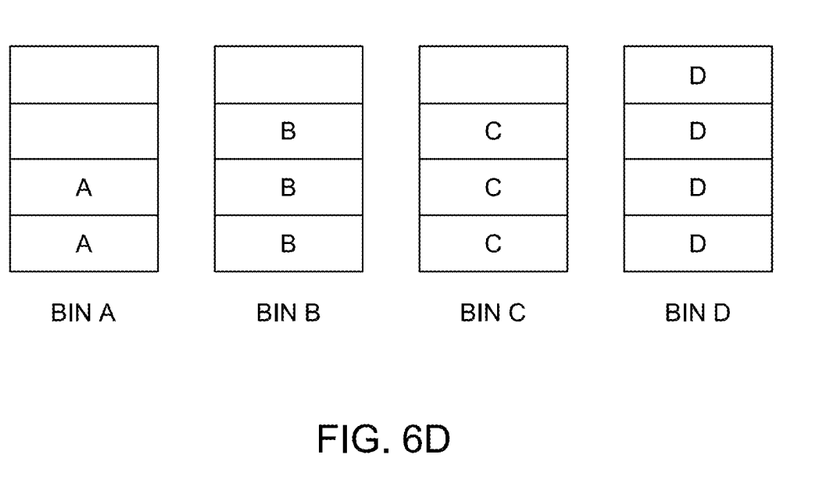

FIGS. 6A-6D illustrate a technique applied by WIC 137 to sort the work-items shown in FIG. 5 for paused wavefronts, according to an example. Each of FIGS. 6A-6D shows four bins (Bin A to Bin D), each of which corresponds to an associated sorting parameter. FIG. 6A shows the state of the bins after WIC 137 sorts the work-items in Wavefront #1. WIC 137 sorts the two work-items associated with sort parameter A in Wavefront #1 into Bin A, the single work-item associated with sort parameter B in Wavefront #1 into Bin B, and the single work-item associated with sort parameter D in Wavefront #1 into Bin D. FIG. 6B shows the state of the bins after WIC 137 sorts the work-items in Wavefront #2. WIC 137 sorts the two work-items associated with sort parameter D in Wavefront #2 into Bin D, the single work-item associated with sort parameter A in Wavefront #2 into Bin A, and the single work-item associated with sort parameter B in Wavefront #1 into Bin B. At this point, none of the bins are full. FIG. 6C shows the state of the bins after WIC 137 sorts the work-items in Wavefront #3. WIC 137 sorts the two work-items associated with sort parameter C in Wavefront #3 into Bin C, the single work-item associated with sort parameter B in Wavefront #3 into Bin B, and the single work-item associated with sort parameter A in Wavefront #3 into Bin A. At this point, Bin A is full. In the example shown, when a Bin (e.g., Bin A) is full, the work-items in that bin are returned to a paused wavefront which resumes execution based on the returned work-items. In this example, after the work-items in Bin A are returned to the paused wavefront, Bin A is empty. WIC 137 continues sorting (with Bin A now empty) after returning the work-items in Bin A to the previously paused wavefront. FIG. 6D shows the state of the bins after WIC 137 sorts the work-items in Wavefront #4. WIC 137 sorts the two work-items associated with sort parameter A in Wavefront #4 into Bin A, the single work-item associated with sort parameter C in Wavefront #4 into Bin C, and the single work-item associated with sort parameter D in Wavefront #4 into Bin D. At this point, Bin D is full, and the work-items in that Bin D are returned to a previously paused wavefront which resumes execution based on the returned work-items. The process of sorting work-items and returning sorted work-items to paused wavefronts continues as other wavefronts provide work-items to WIC 137 for sorting.

While for simplicity the sorting process depicted in FIGS. 6A-6D is shown as proceeding from top to bottom (i.e., from Wavefront #1 at the top of FIG. 5 to Wavefront #4 at the bottom of FIG. 5), it will be understood that work-items from paused wavefronts are typically received by WIC 137 at various times as wavefronts execute asynchronously. In some examples, WIC 137 sorts work items in the order received, or in some other order.

Figure 7:
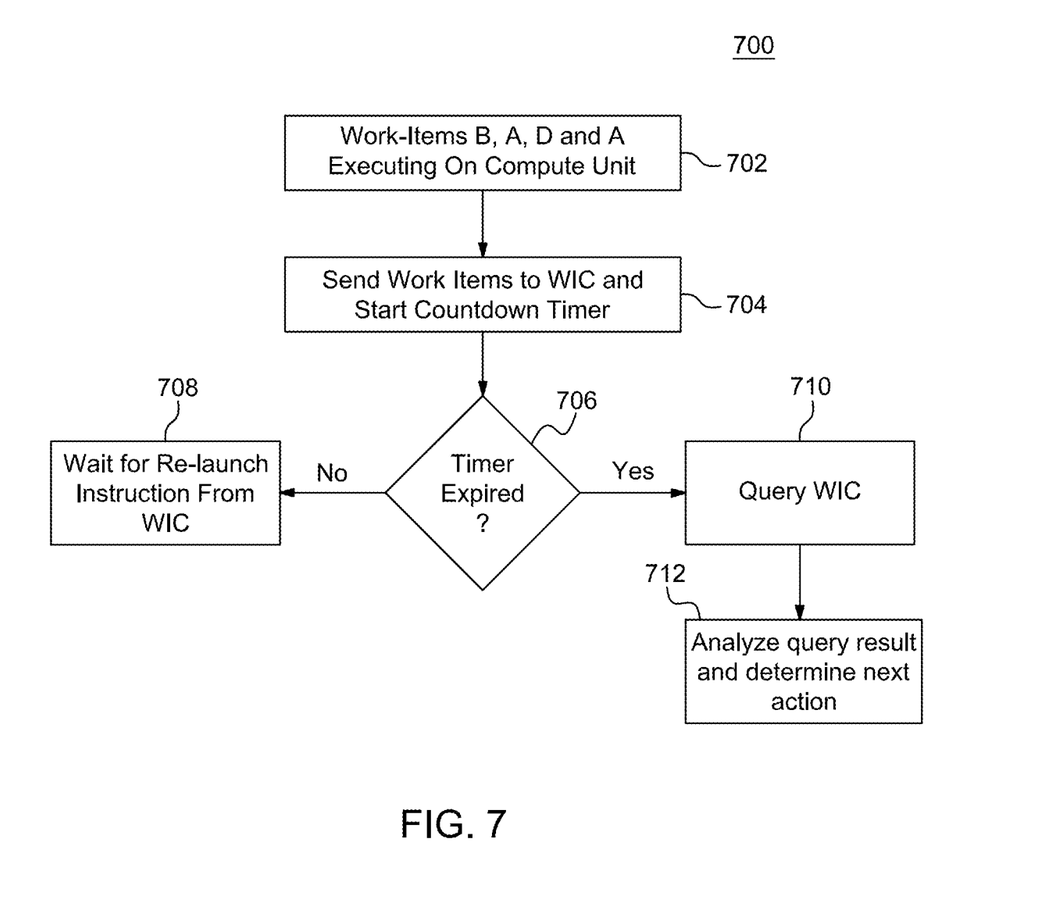
FIG. 7 illustrates a process in which a countdown timer is started when requesting a first wavefront to pause execution and a sorting operation is queried upon expiration of the countdown timer, according to an example.

FIG. 7 illustrates a process 700 in which a countdown timer is started when requesting a first wavefront to pause execution and the sorting operation is queried upon expiration of the countdown timer, according to an example. In step 702, a wavefront is executing on a compute unit (e.g., computer unit 132). The wavefront includes work-items with sort parameters B, A, D and A, and encounters a divergence condition. In an example, the divergence condition is that the wavefront is to execute code dependent on the sort parameter. For example, the wavefront may perform an indirect jump or function pointer call to a point in a shader program dependent on the sort parameter, meaning that different work-items with different sort parameters would execute different parts of the shader and would thus be divergent. In step 704, the wavefront sends its work-items to WIC 137 and requests that the work-items be sorted (e.g., based on a sort parameter) together with work-items of one or more other wavefronts. An instruction is issued requesting the wavefront to pause, and a countdown timer is started.

In some examples, each wavefront associated with the kernel launch has an individually configurable countdown timer duration. For example, a wavefront adjusts its timer duration up or down in response to one or more specific parameters such as the number of active work-items in the wavefront (the greater the number of work-items, the longer the timer duration), one or more program task categories (the more highly dispersed the tasks, the longer the timer duration), and/or the number of inflight parallel wavefronts (the more parallel executing wavefronts, the higher the timer duration).

In one example, the countdown timer is set based on a combination of the number of active work-items and the wait time per work-item. The number of active work-items often varies by wavefront. In some cases, the wait time per work-item is a preset parameter. In some such examples, the countdown timer is set based on the product of the number of active work items and the wait time per work item. The higher the product, the longer the countdown timer duration. In another example, the countdown timer is set based on program task categories associated with a wavefront. For example, the countdown timer duration is set longer when the task categories are more dispersed. In a further example, the countdown timer duration is adjusted up or down as the number of parallel alive wavefronts dynamically changes. For example, when there are fewer parallel executing wavefronts (resulting in the chances of a bin filling up being reduced), the duration of the countdown timer is adjust downwardly (made smaller).

Referring still to FIG. 7, Step 706 illustrates that, prior to expiration of the countdown timer, the paused wavefront waits for WIC 137 to return sorted work-items back to the wavefront for execution (step 708). If the countdown expires before WIC 137 returns sorted work-items back to the wavefront for execution, the wavefront send a query to WIC 137 (Step 710). In some examples, the query requests information indicating whether the sorting operation is ready or near ready to return sorted work-items to the first wavefront. (One such example is described in connection with FIG. 8 below.) In some examples, the sorting operation determines that it is near-ready to return sorted work-items to the first wavefront by determining whether the difference between the gathered number of work-items associated with one or more sort-keys and, e.g., the number of work-items associated with a full bin (as described above.) If the difference is less than a predetermined threshold, the sorting operation determines that it is near-ready to return sorted work-items to the first wavefront. Based on the query result, the wavefront determines a subsequent action (Step 712). In various other examples, the query can request other information about the state of the WIC 137, such as the level of one or more bins, an amount of time that a bin has existed in WIC 137 without reaching a filled state, and/or a number of bins that have prioritized the wavefront issuing the query as the wavefront to which to return work-items.

In some examples (described below), in response to a query result indicating that WIC 137 is near-ready to return sorted work-items to the wavefront, the wavefront issues one or more further queries to WIC 137 to determine the level(s) of work-items in bin(s). The wavefront uses the result(s) of the one or more further queries to determine whether to continue waiting for WIC 137 to return sorted work-items (e.g., from a full bin) or alternatively trigger a flush bin operation. In the flush bin operation, WIC 137 returns available work-items to the wavefront in a partially-sorted or unsorted state (i.e., there may still be divergence in the work-items returned). In some examples, the one or more further queries request information on the current level (number) of work-items in one or more bin(s) and/or an indication of which bin(s) have the highest level of work-items. In one example, if such a further query occurred while the bins were in the state shown in FIG. 6B, the query would request information on the state of the bin(s) with the highest number of work-items, in which case WIC 137 would return a result indicating that Bin A and Bin D currently each have three work-items. By way of further example, if the further query occurred while the bins were in the state shown in FIG. 6B, the query would request information on the state of Bins A-D, in which case WIC 137 would return a result indicating that Bin A and Bin D currently each have three work-items, Bin B currently has 2 work-items and Bin C is empty. In some examples, the wavefront issues multiple queries to WIC 137 to determine the current state of one or more bins.

In some examples, based on information on the state of the bin(s) returned from the queries described above, the wavefront implements various actions. In one example, if the number of work-items in a bin is close to a return threshold, the wavefront will continue to wait for an additional period for WIC 137 to return sorted work-items (e.g., from a full bin). In some such cases, the wavefront will compare the number of work-items in the bin to a predefined threshold and continue waiting for the additional period if the number of work-items in the bin either equals or exceeds the threshold. In an alternative example, if the number of work-items in one or more bins is close to the return threshold (e.g., a full bin), the wavefront issues a request to WIC 137 to assess whether other work-items are available to be sent to the wavefront to execute. Depending on the result, the wavefront can either continue waiting for an additional period or trigger a flush causing WIC 137 to return work-items to the wavefront in a partially-sorted or unsorted state. In a further alternative example, if the number of work-items in all bins is low (e.g., less than or equal to a predefined threshold) and the wavefront has no other work-items to execute, the wavefront triggers a flush. In a still further alternative example, if the wavefront determines that the state(s) of bin(s) is changing slowly (e.g., if a number of work-item(s) added to bin(s) is below a threshold over two or more queries), the wavefront triggers a flush.

In some examples, in respond to a flush instruction, WIC 137 returns some combination of the work-items currently in the bin to the wavefront even though no bin has reached a state where it is full. For example, if the flush instruction was issued while the bins were in the state shown in FIG. 6B, the flush operation would result in WIC 137 returning only three work-items shown in Bin A to the wavefront, while in other examples, WIC 137 returns four work-items (e.g., three from Bin A and one from Bin B) to the wavefront.

Figure 8:
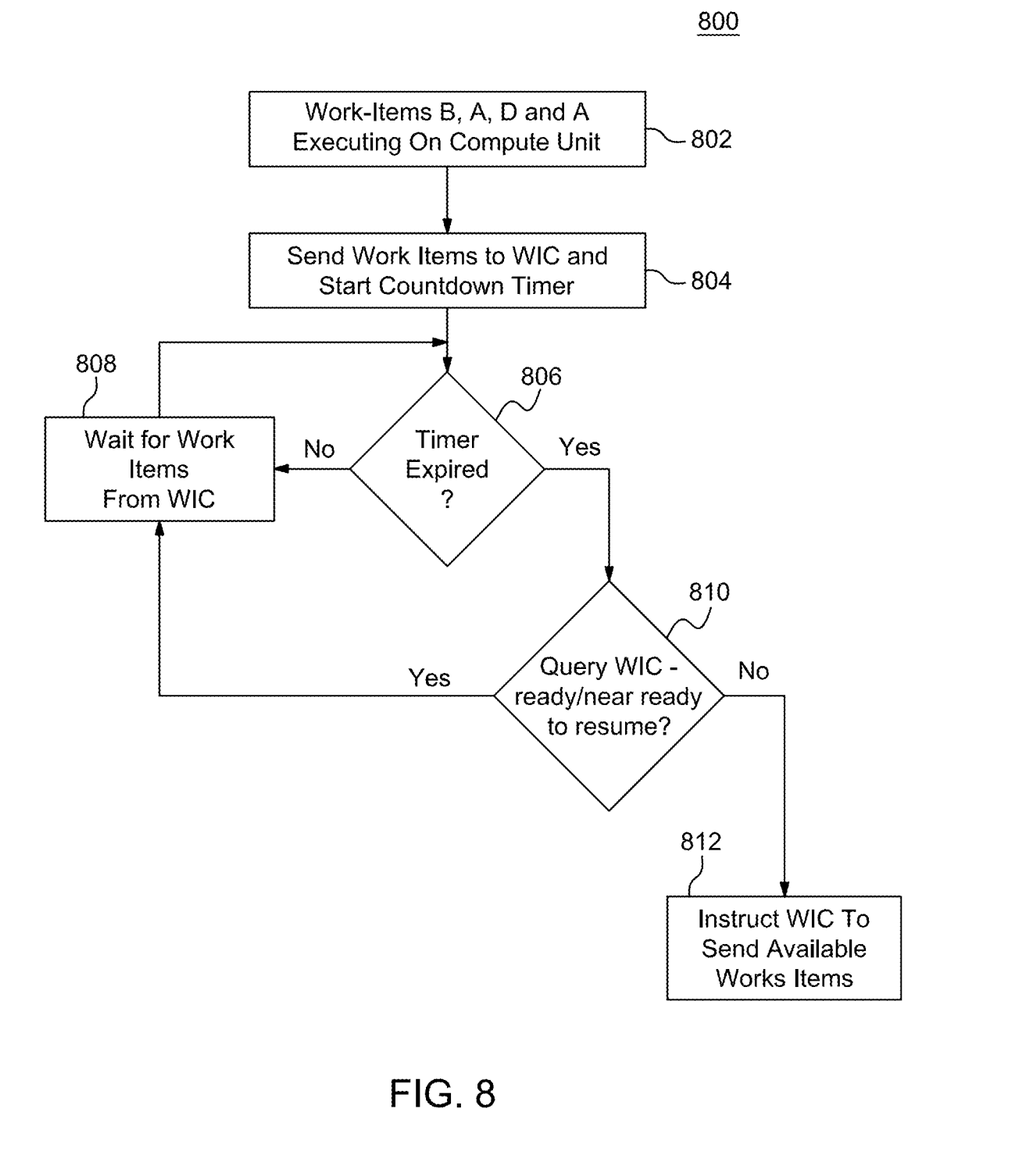
FIG. 8 illustrates a process in which a countdown timer is started when requesting the first wavefront to pause execution and the sorting operation is queried upon expiration of the countdown timer, according to a further example.

FIG. 8 illustrates a process 800 in which a countdown timer is started when requesting the first wavefront to pause execution and the sorting operation is queried upon expiration of the countdown timer, according to an example. In Step 802, a wavefront is executing on a compute unit (e.g., computer unit 132). The wavefront includes work-items with sort parameters B, A, D and A, and encounters a divergence condition. In Step 804, the wavefront sends its work-items to WIC 137 and requests that the work-items be sorted (e.g., based on a sort parameter) together with work-items of one or more other wavefronts. An instruction is issued requesting the wavefront to pause, and a countdown timer is started. Step 806 illustrates that, prior to expiration of the countdown timer, the paused wavefront waits for WIC 137 to return sorted work-items back to the wavefront for execution (Step 808). If the countdown expires before WIC 137 returns sorted work-items back to the wavefront for execution, the wavefront sends a query to WIC 137 requesting information indicating whether the sorting operation is ready or near ready to return sorted work-items to the first wavefront (Step 810). Based on the query result, the wavefront either continues waiting for an additional period for WIC 137 to return sorted work-items (Step 808) or instructs WIC 137 to return available work-items (partially-sorted or unsorted) to the wavefront (Step 812). While not shown, in some embodiments the wavefront issues further queries to WIC 137 to determine the state(s) of one or more bin(s) after Step 810 and before Step 808 or 812.

Figure 9:
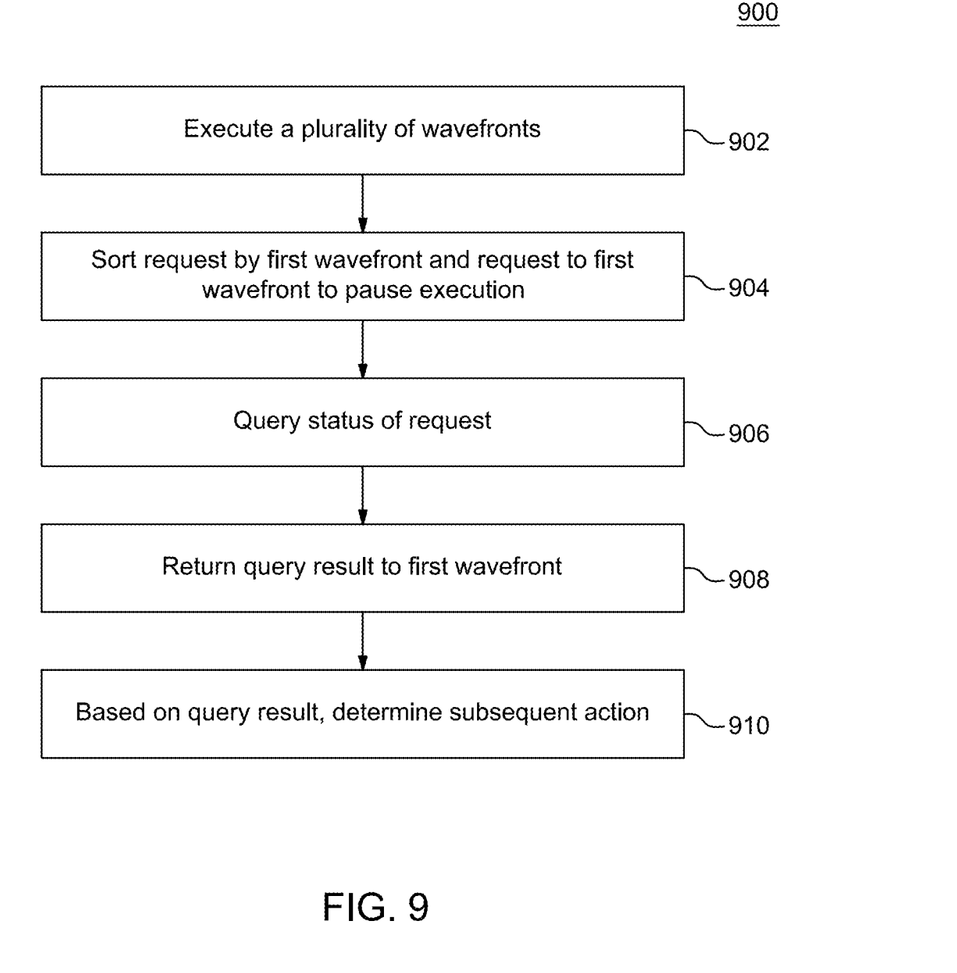
FIG. 9 illustrates a process for reducing divergence, according to an example.

FIG. 9 illustrates a process 900 for reducing divergence, according to an example. In Step 902, a plurality of wavefronts are executing, each of the wavefronts having a plurality of work-items. For example, a plurality of wavefronts are executing on a computer unit 132. In some cases, the wavefronts execute asynchronously.

In Step 904, a first wavefront requests that work-items of the first wavefront be sorted based on a sort parameter together with work-items of one or more other wavefronts, and the first wavefront is requested to pause execution. In some examples, a sorting operation is performed that sorts work-items into a plurality of bins, wherein work-items in each one of the plurality of bins have a common parameter. In some such examples, each one of the plurality of bins includes work-items selected to minimize divergence when executed on parallel processing units 138 of a compute unit 132.

In Step 906, the wavefront issues one or more queries for a status of the sorting request, and in Step 908 one or more query results are provided to the first wavefront. In some examples, the query result(s) indicate whether the sorting operation is ready or near ready to return work-items to the first wavefront. In other examples, the one or more further queries return information on the current level of work-items in one or more bin(s) and/or an indication of which bin(s) have the highest level of work-items. In another example, the query results indicate that the state(s) of bin(s) are changing slowly (e.g., a number of work-item(s) added to bin(s) is below a threshold over two or more queries).

In Step 910, the wavefront determines a subsequent action based on the query result(s). For example, the wavefront uses the result(s) of the one or more further queries to determine whether to continue waiting for WIC 137 to return sorted work-items (e.g., from a full bin) or alternatively trigger a flush bin operation. In one example, if the number of work-items in a bin is close to a return threshold, the wavefront will continue to wait for an additional period for WIC 137 to return sorted work-items (e.g., from a full bin). In some such cases, the wavefront will compare the number of work-items in the bin to a predefined threshold and continue waiting for the additional period if the number of work-items in the bin either equals or exceeds the threshold. In another example, if the number of work-items in one or more bins is close to the return threshold (e.g., a full bin), the wavefront assesses whether other work-items are available to be sent to the wavefront to execute and either continues waiting for an additional period or triggers a flush. In a further alternative example, if the number of work-items in all bins is low (e.g., less than or equal to a predefined threshold) and the wavefront has no other work-items to execute, the wavefront triggers a flush. In a still further alternative example, if the wavefront determines that the state(s) of bin(s) is changing slowly, the wavefront triggers a flush.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, WIC 137, the parallel processing units 138, may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method, comprising:
    executing a plurality of wavefronts;
    requesting by a first wavefront of the plurality of wavefronts that work-items of the first wavefront be sorted based on a sort parameter together with work-items of one or more other wavefronts of the plurality of wavefronts, and requesting the first wavefront to pause execution;
    querying a status of the sorting request;
    returning a query result to the first wavefront; and
    based on the query result, determining a subsequent action by the first wavefront.

2. The method of claim 1, further comprising:
    performing a sorting operation that sorts work-items into a plurality of bins, wherein work items in each one of the plurality of bins have a common parameter;
    wherein the query result is based on a level of work-items in at least one of the bins.

3. The method of claim 2, wherein each one of the plurality of bins includes work-items selected to minimize divergence when executed on parallel processing units of a compute unit.

4. The method of claim 2, wherein the query result indicates whether the sorting operation is ready or near ready to return work-items to the first wavefront.

5. The method of claim 4, wherein if the query result indicates that the sorting operation is ready or near ready to return work-items to the first wavefront, the first wavefront waits for the sorting operation to return work-items that have been sorted into a single bin to the first wavefront.

6. The method of claim 5, wherein if the query result indicates that the sorting operation is neither ready nor near ready to return work-items to the first wavefront, the first wavefront issues a request to the sorting operation requesting that available work-items be provided to the first wavefront.

7. The method of claim 5, wherein if the query result indicates that the sorting operation is neither ready nor near ready to return work-items to the first wavefront, the first wavefront issues a request to perform a flush that results in return of divergent work-items.

8. The method of claim 4, wherein the query result indicates that the sorting operation is neither ready nor near ready to return work-items to the first wavefront if a rate of change in a level of a bin fails to exceed a threshold over a period of a plurality of queries.

9. The method of claim 2, further comprising:
    starting a countdown timer when requesting the first wavefront to pause execution; and
    querying of the sorting operation upon expiration of the countdown timer.

10. The method of claim 9, wherein each of the plurality of wavefronts has an individually configurable countdown timer duration.

11. A system comprising:
    a processor that includes at least one compute unit comprising a plurality of parallel processing units; and
    a memory storing instructions that, when executed by the processor, cause the processor to perform operations including:
    execute a plurality of wavefronts;
    request by a first wavefront of the plurality of wavefronts that work-items of the first wavefront be sorted based on a sort parameter together with work-items of one or more other wavefronts of the plurality of wavefronts, and request the first wavefront to pause execution;
    query a status of the sorting request;
    return a query result to the first wavefront; and
    based on the query result, determine a subsequent action by the first wavefront.

12. The system of claim 11, wherein the processor is further configured to:
    perform a sorting operation that sorts work-items into a plurality of bins, wherein work-items in each one of the plurality of bins have a common parameter;
    wherein the query result is based on a level of work-items in at least one of the bins.

13. The system of claim 12, wherein each one of the plurality of bins includes work-items selected to minimize divergence when executed on the parallel processing units.

14. The system of claim 12, wherein the query result indicates whether the sorting operation is ready or near ready to return work-items to the first wavefront.

15. The system of claim 14, wherein the processor is further configured to:
   if the query result indicates that the sorting operation is ready or near ready to return work-items to the first wavefront, cause the first wavefront to wait for the sorting operation to return work-items that have been sorted into a single bin to the first wavefront.

16. The system of claim 15, wherein the processor is further configured to:
   if the query result indicates that the sorting operation is neither ready nor near ready to return work-items to the first wavefront, cause the first wavefront to issue a request to the sorting operation requesting that available work-items be provided to the first wavefront.

17. The system of claim 15, wherein the processor is further configured to:
   if the query result indicates that the sorting operation is neither ready nor near ready to return work-items to the first wavefront, cause the first wavefront to issue a request to perform a flush that results in return of divergent work-items.

18. The system of claim 14, wherein the query result indicates that the sorting operation is neither ready nor near ready to return work-items to the first wavefront if a rate of change in a level of a bin fails to exceed a threshold over a period of a plurality of queries.

19. A non-transitory computer-readable medium storing instructions that, when executed by a processor, cause the processor to perform operations comprising:
   execute a plurality of wavefronts;
   request by a first wavefront of the plurality of wavefronts that work-items of the first wavefront be sorted based on a sort parameter together with work-items of one or more other wavefronts of the plurality of wavefronts, and request the first wavefront to pause execution;
   query a status of the sorting request;
   return a query result to the first wavefront; and
   based on the query result, determine a subsequent action by the first wavefront.

20. The non-transitory computer-readable medium of claim 19, further comprising instruction that cause the processor to perform the following operation:
   perform a sorting operation that sorts work-items into a plurality of bins, wherein work-items in each one of the plurality of bins have a common parameter; and
   wherein the query result is based on a level of work-items in at least one of the bins.

* * * * *